March 26, 1963
A. E. MOULTON
3,083,039
PEDAL CYCLES
Filed Oct. 28, 1960
6 Sheets-Sheet 1
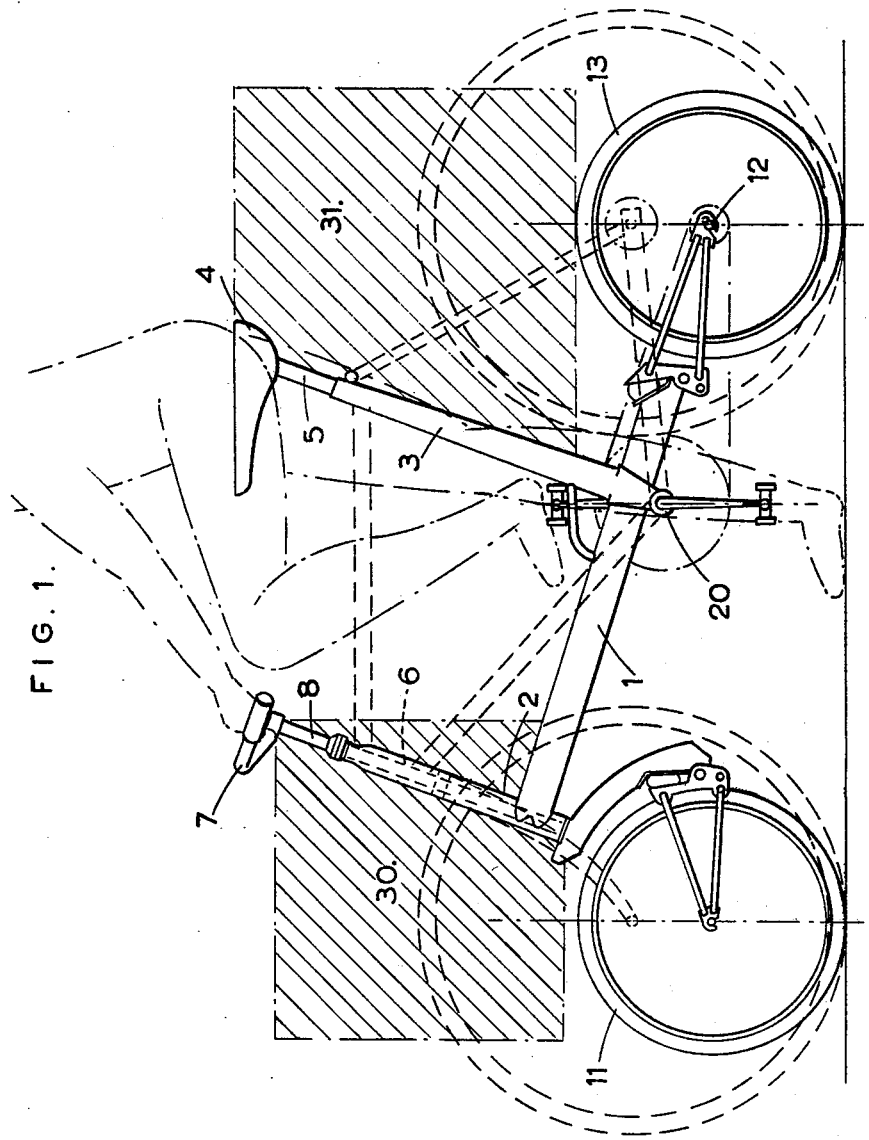
INVENTOR
ALEXANDER ERIC MOULTON
BY
Shoemaker and Mattare
ATTORNEYS

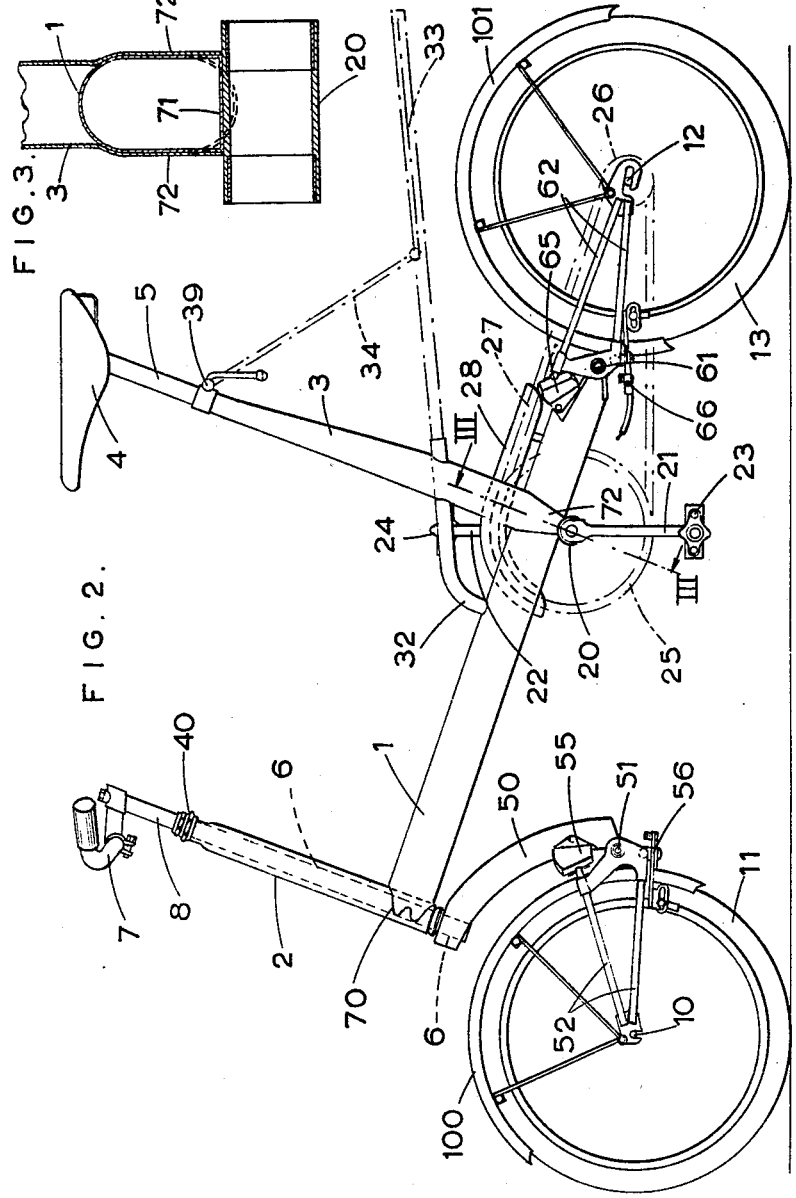

March 26, 1963 A. E. MOULTON 3,083,039
PEDAL CYCLES
Filed Oct. 28, 1960 6 Sheets-Sheet 3

INVENTOR
ALEXANDER ERIC MOULTON
BY
Shoemaker and Mattare
ATTORNEY.S

March 26, 1963  A. E. MOULTON  3,083,039
PEDAL CYCLES
Filed Oct. 28, 1960  6 Sheets-Sheet 4
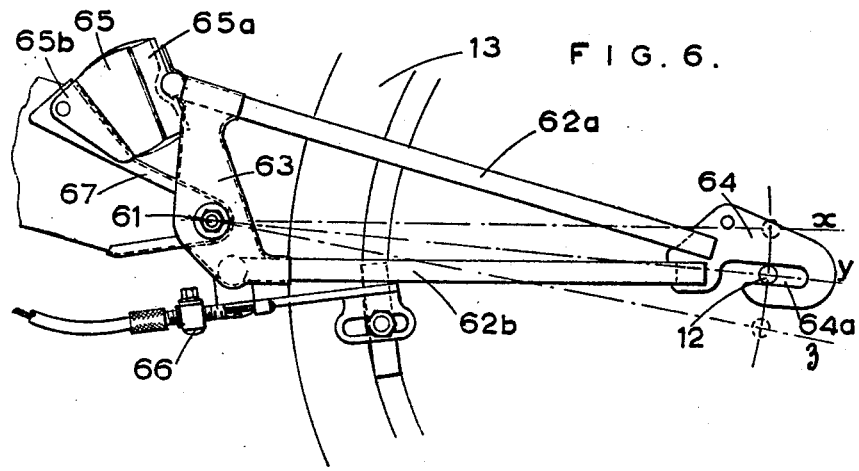
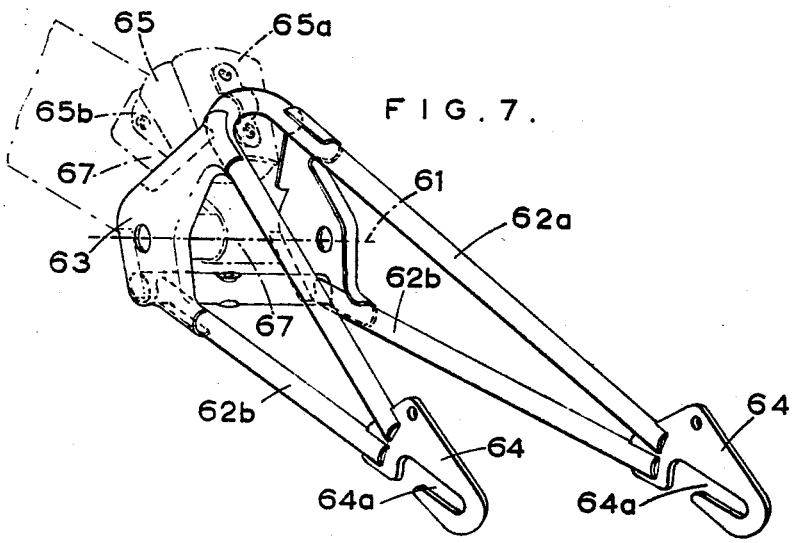
INVENTOR
ALEXANDER ERIC MOULTON
BY
*Shoemaker and Mattare*
ATTORNEYS

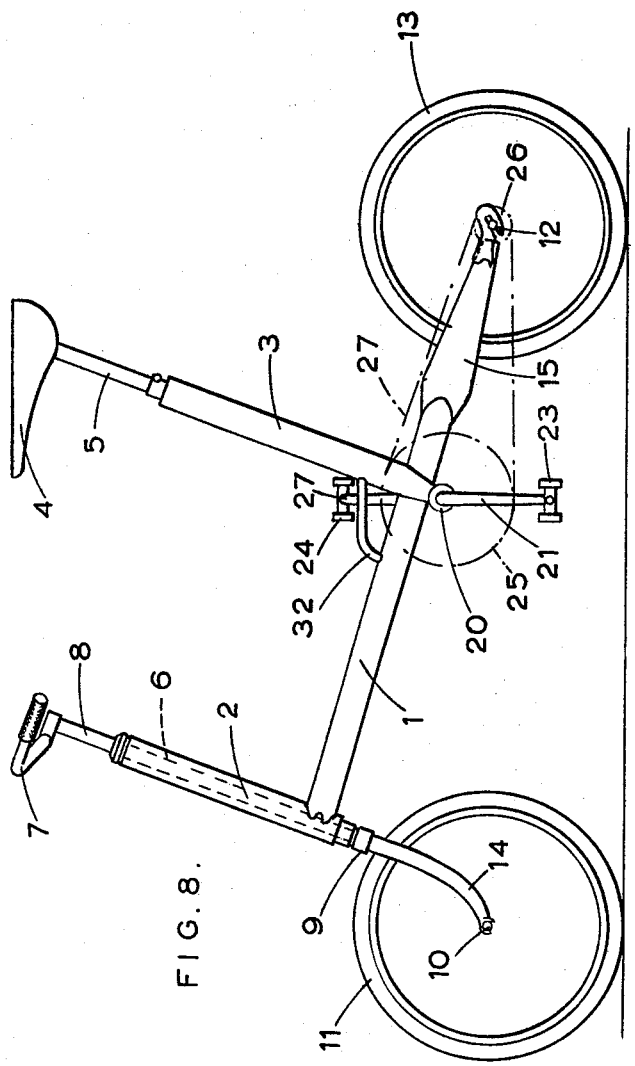

March 26, 1963
A. E. MOULTON
3,083,039
PEDAL CYCLES
Filed Oct. 28, 1960
6 Sheets-Sheet 6
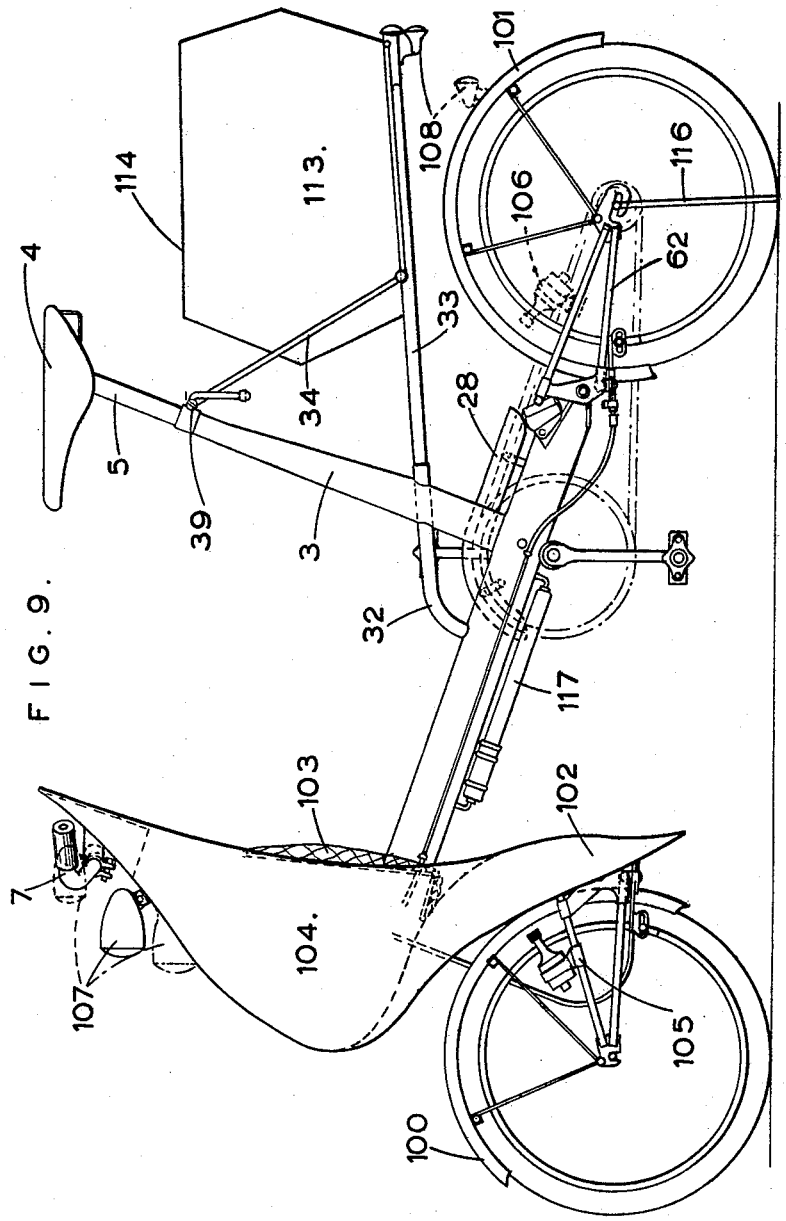
INVENTOR
ALEXANDER ERIC MOULTON
BY
Shoemaker and Mattare
ATTORNEYS

United States Patent Office 3,083,039
Patented Mar. 26, 1963

3,083,039
PEDAL CYCLES
Alexander Eric Moulton, Bradford-on-Avon, England, assignor to Moulton Consultants Limited, Bradford-on-Avon, England, a British company
Filed Oct. 28, 1960, Ser. No. 65,830
Claims priority, application Great Britain Nov. 16, 1959
7 Claims. (Cl. 280—277)

This invention relates to pedal bicycles including motorized bicycles or mopeds.

A conventional modern pedal "safety" bicycle with normal wheelbase and a normal crank-throw has a layout which includes a triangular disposition (when viewed in side elevation) of the three points, the seat, the handlebars and the pedal crank axle housing in vertical relation to the ground and in longitudinal relation to the wheelbase, which is generally accepted in the art. The actual configuration of the triangle formed by the disposition of these three points will of course be appropriate to the stature of the rider and to the mode of riding. Such a layout is referred to hereinafter as a "conventional layout."

Such conventional bicycles normally have pneumatically tyred wheels of an overall diameter of between 24 and 30 inches. In this specification by "wheels of small diameter" is meant tyred wheels having an overall diameter of between 12 and 19 inches and preferably of the order of 16 inches.

According to the present invention a pedal bicycle or moped having a conventional layout as above defined is provided with both front and rear wheels of small diameter and with a frame comprising a backbone extending from a point above and near the top of the front wheel towards the rear wheel spindle, said backbone passing to or through a point near a housing for the pedal crank axle and having means for supporting handlebars and a seat.

Preferably the backbone has upstanding from it substantially at right angles, from its front end above the front wheel, a steering post for pivotally supporting a steering column, and from a point near the housing for the pedal crank axle, a seat tube for supporting a seat or saddle.

Preferably the crank axle housing is attached directly to the underside of the backbone which latter extends in a straight line from the point above and near the top of the front wheel towards the rear wheel spindle.

The backbone, the steering post and the seat tube are advantageously of tubular construction, the steering post and the seat tube being so joined to the backbone that the latter is not pierced or apertured at the junctions.

Preferably the backbone is formed of hollow tubing which has a greater depth than width and advantageously its cross section is that of a flat sided oval or ellipse having its minor axis horizontal.

Alternatively the backbone may be formed from a plurality of tubes clustered together, and advantageously two or more tubes are employed, attached together and superimposed one above another.

The backbone, the seat tube and the steering post may be either light alloy extrusions or the tubes may be formed from steel pressings joined together to form tubes.

Preferably the frame elements are joined together without employing lug joints, brazed or welded lap joints suitably being used.

The backbone may be in two parts so as to be collapsible or able to be hinged for storage or transportation.

Preferably also the backbone terminates at a point ahead of the rear and provides a mounting for rearwardly extending forks carrying the rear wheel spindle or it may provide a mounting for a resilient suspension system for the rear wheel. Similarly the front wheel may be carried on forks mounted at the base of the steering column, but preferably however an arcuate member depends from the steering column rearwardly of the front wheel and at its lower end provides a mounting for a leading arm structure on which the front wheel is resiliently carried. Alternatively this arcuate member may depend forwardly of the front wheel to provide a mounting for a trailing arm carrying the front wheel.

The wheels will suitably be provided with pneumatic tyres but solid tyres may be used, particularly when the wheels are resiliently supported.

The invention will now be described with reference to the accompanying drawings in which:

FIGURE 1 is a simplified side view of one embodiment of a bicycle according to the invention and having a conventional layout as hereinbefore defined but with wheels of small diameter, shown superimposed on the outline of a "safety" bicycle having a conventional layout.

FIGURE 2 is a side view of a preferred embodiment of the invention.

FIGURE 3 is a cross-sectional view to larger scale taken on the line III—III of FIGURE 2 (with moving parts omitted).

FIGURE 6 is a side view of a preferred rear wheel suspension arrangement for the embodiment shown in FIGURE 2.

FIGURE 7 is a perspective view of the rear fork assembly shown in FIGURE 6.

FIGURE 8 is a side view of a simplified embodiment of the invention.

FIGURE 9 is a side view of a fully equipped version of the embodiment illustrated in FIGURE 2.

Figure 4:
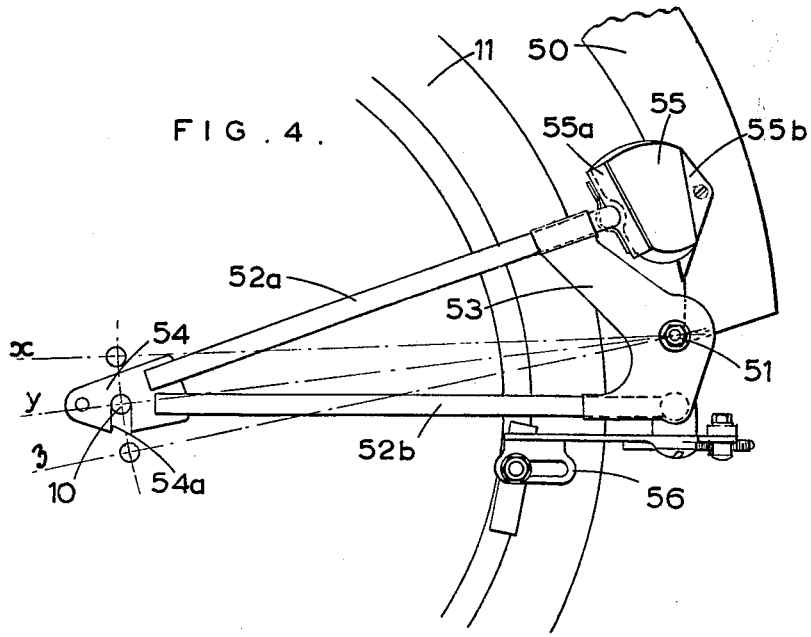
FIGURE 4 is a side view of a preferred front wheel suspension arrangement for the embodiment shown in FIGURE 2.

Referring now to FIGURE 1, a bicycle having a conventional layout as hereinbefore defined, with front and rear wheels 11 and 13 respectively of small diameter, is provided with a frame comprising a backbone 1, extending from a point above and near the top of the front wheel 11 in a straight line towards the spindle 12 of the rear wheel 13, said backbone 1 passing through a point near the housing 20 for a pedal crank axle which housing 20 is adjoined directly to the under side of the backbone 1.

The backbone 1 has upstanding from it substantially at right angles, from its front end above the front wheel 11, a steering post 2 for pivotally supporting a steering column or member 6 at the upper end of which are mounted handlebars 7 on a stem 8 and from a point near the housing 20 for the pedal crank axle a seat tube 3 upstands substantially at right angles from the backbone 1. A seat or saddle 4 is carried on a stem 5 at the upper end of the tube 3.

It will be appreciated that the bicycle having small wheels according to the invention illustrated in this figure is provided with a conventional layout. That is to say that when compared with the outline of the conventional "safety" bicycle shown in dotted lines, the wheel base (i.e. the distance between the front and rear wheel centres) is similar, the crank throw (i.e. the length of the pedal cranks) is similar and the triangular disposition (when viewed in side elevation) of the three points, the seat 4, the pedal crank axle housing 20 and the handlebars 7 is identical in the two machines shown in this representation. It is to be emphasized that a bicycle according to the present invention has a conventional layout in these respects such as to provide a riding position well known in the art. This layout will vary slightly and the actual configuration will be appropriate to the stature of the rider and to the mode of riding.

This representation illustrates also the difference in overall length of the two machines and the low "step-over" height of the small-wheeled bicycle according to the invention, enabling it to be mounted by riders of either sex with equal ease. Moreover it will be seen that very large areas, shown dotted at 30 and 31, are available above the front and rear wheels but within the overall height and length of the machine according to the invention, such areas being suitable for luggage accommodation.

Further features of a bicycle having wheels of small diameter and a frame according to the invention will now be described with reference to FIGURE 2 which shows a bicycle generally similar to that illustrated in FIGURE 1, corresponding reference numerals being employed for like or equivalent parts.

The numerals 21 and 22 are pedal cranks carrying pedals 23 and 24 for rotating a chain wheel 25 driving a rear sprocket 26 by a conventional chain 27 having a chain guard 28.

Adjustability of the height of the seat 4 is obtained by clamping means having a manually rotatable nut and bolt locking device indicated at 39 and functioning in a known manner to clamp the stem 5 at the required position within the tube 3. Similarly clamping means 40 of known kind maintains the stem 8 carrying handlebars 7 at the required height and position relative to the steering column 6 carried within the post 2.

At the lower end of the steering column 6, an arcuate member 50 depends rearwardly of the front wheel, it being understood that such arcuate member 50 is arranged to turn with the steering column when the handlebars 7 are rotated. At its lower end the arcuate member 50 is provided with a substantially horizontal pivot or bearing 51 on which is carried a leading arm structure generally designated 52 having at its front end means for mounting the spindle 10 of the front wheel 11. The leading arm structure 52 is able to pivot in a vertical plane (when the machine is upright) about the bearing 51 and this pivotal movement is resiliently controlled by means of a single spring 55, suitably a rubber compression spring, connected between the structure 52 and the member 50.

A generally similar arrangement is utilized for resiliently supporting the rear wheel 13. In this case a substantially horizontal pivot or bearing 61 is provided at the rear of the backbone 1 for pivotally mounting a trailing arm structure generally designated 62 able to pivot in a vertical plane (when the machine is upright) and controlled by a single spring 65 connected between the structure 62 and the backbone 1.

The front end of the backbone 1 is formed with two ears 70 arranged to embrace the steering post 2 to which they are attached by brazing or welding or alternatively by an adhesive.

The numeral 32 is a combined carrying handle and stay between the backbone 1 and the seat tube 3 which may be extended through the latter to provide a mounting for a carrier, shown in dotted outline at 33 having a pair of stays 34 carried from the device 39.

Front and rear brakes 56 and 66 respectively, which are of known kind, are suitably carried on the wheel supporting structures so as suitably to be positioned to engage the wheel at all times. Front and rear mudguards 100 and 101 respectively are also mounted on the wheel supporting structures.

The preferred method of joining the tube 3 and the housing 20 to the backbone 1 is shown in detail in FIGURE 3 which is a cross-sectional view through the line III—III in FIGURE 2. From FIGURE 3 it will be seen that the cross-section of the backbone 1 is that of a flat sided oval with its minor axis horizontal. At its juncture with the housing 20 for a pedal crank axle (not shown) the underside of the backbone is "dimpled" as indicated at 71 in such manner that the generally cylindrical housing 20 fits snugly into the concavity of the dimple 71 and is fixed therein by brazing or welding or by an adhesive over the full width of the backbone. The lower end of the tube 3 is shaped to form two generally triangular ears 72, which embrace the backbone 1 and are attached on either side thereof by brazing, welding or adhesive.

It will be noted that the juncture of the members illustrated in FIGURE 3 does not involve lug joints, which are expensive, nor does it necessitate the piercing or aperturing of the backbone whose structural strength is not thereby impaired. One of the main characteristic features of the invention is also apparent from this figure namely the feature of the housing 20 being attached directly to the underside of the backbone, as opposed to being located some distance below it. This feature ensures the torsional rigidity of the frame during pedal thrusts in a simple and economical manner. It will also be appreciated that whereas in the frame of a conventional "safety" bicycle there are at least eight joints, usually brazed lug joints of a relatively expensive type, in the present invention only three frame joints are called for. This is one factor which enables the frame to be manufactured more cheaply than the frame of a conventional "safety" bicycle, a further factor being that less metal is used in the frame of the bicycle according to the invention.

Moreover the fact that less metal is employed in the frame of the bicycle according to the invention in conjunction with the fact that its small wheels are lighter than those of a conventional "safety" bicycle enables it to have an overall weight which is considerably less than that of a similarly equipped conventional bicycle.

Figure 5:
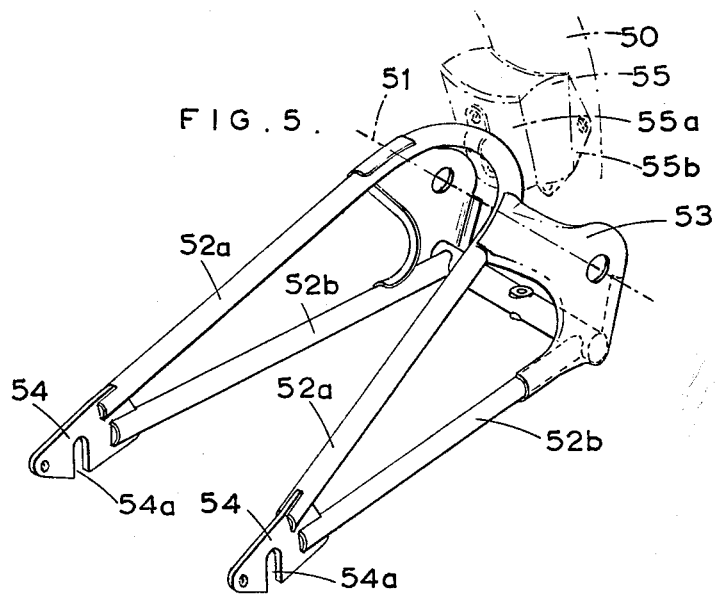
FIGURE 5 is a perspective view of the front fork assembly shown in FIGURE 4.

Referring now to FIGURES 4 and 5, where a preferred form of front suspension system is shown in detail, it will be seen that the structure 52 is formed of a generally U-shaped member 52a and a pair of rod members 52b one on each side of the front wheel 11, the members 52a and 52b being connected to one another by a fabricated bracket member generally designated 53 pivotally carried by the bearing 51. The bend of the U-shaped member 52a embraces the tyre of the wheel 11 and bears against the spring 55. The legs of the U-shaped member 52a pass on each side of the wheel towards the spindle 10 with which they are associated by end plates 54 to which they are attached. The end plates 54 are each formed with notches 54a in which the wheel spindle 10 is adapted to be located by a locking device of known kind (not shown). The rod members 52b are each attached at one end to the end plate member 54 on that side of the wheel and at the other end to the bracket 53. A calliper brake assembly of known kind and generally designated 56 is also carried by the member 53, thereby ensuring that at all times the brake pads will be correctly positioned to engage the rim of the wheel.

The rubber spring 55 is of general wedge form in side elevation and is bonded between metal plates 55a and 55b, the former being attached to the U-shaped member 52a and the latter to the arcuate member 50. When the wheel encounters a surface inequality the leading arm structure pivots about the bearing 51 and the spring 55 is deflected in compression. The full bump, static and rebound positions of the suspension are shown at x, y and z respectively.

The arrangement of the rear wheel suspension system shown in FIGURES 6 and 7 comprises a fabricated bracket member generally designated 63 pivotally carried by the bearing 61 mounted at the rear end of the backbone 1. The trailing arm structure comprises a U-shaped member 62a with its legs connected to end plate members 64 and with its bend bearing against the spring 65, said structure also including a rod member 62b on either side of the wheel and connected between the bracket member 63 and the end plate member 64 which latter is provided with a notch 64a in which the wheel spindle 12 is adapted to be located by a lock nut, one on each side (not shown). The U-shaped member 62a is also attached to the bracket member 63. The rubber 65 is again a generally wedge-shaped rubber block bonded between plates 65a and 65b, the former attached to the U-shaped member 62a and the latter to a plate 67 attached to the backbone 1. A calliper brake assembly of known kind and generally designated 66 is carried by the bracket member 63, thereby ensuring that at all times the brake pads will be correctly positioned to engage the rim of the wheel.

The rear suspension arrangement operates generally in the same manner as the front suspension described above and the full bump, static and rebound positions of the suspension are shown at x, y and z respectively.

It is desirable that the distance of the spindle 12 from the pedal crank axle should not vary greatly during the working of the suspension in order to avoid undesirable changes in the tension of the driving chain. Accordingly the bearing 61 is so positioned that it is approximately on the line (when viewed in side elevation) between the pedal crank axle journal and the rear wheel spindle.

Regarding the front and rear suspension arm structures 52 or 62, each structure is rigid in itself due to its triangulated form; it has a single wide pivot to guide the wheel firmly, and a single compression spring preferably of rubber. The arrangement of the rear suspension allows the removal of the driving chain or belt without splitting, and is advantageously strong where the machine is motor-driven.

It has been found that contrary to widely held beliefs a tyre of comparatively small overall diameter can be made which has a similar rolling resistance on normal roads to a tyre of conventional overall diameter, while as such a small tyre and its wheel are considerably lighter than a conventionally sized tyred wheel and therefore have less inertia, pedal thrust is more economically utilised in a bicycle according to the present invention.

As regards gearing, this will be similar to that of a similarly equipped conventional bicycle. Thus preferably with a 16 inch rear wheel a rear sprocket having 14 teeth will be provided in conjunction with a chain wheel say having 52 teeth to give a gearing producing 180 inches of forward movement of the machine for one revolution of the pedals. A conventional three or four speed changeable hub gear or a "derailleur" gear may be provided.

In FIGURE 8 a simplified embodiment of a bicycle according to the invention is illustrated, in which, while the arrangement is otherwise similar to that of the embodiment illustrated in FIGURE 2, the front and rear wheels are not resiliently supported. Instead the spindle 10 of the front wheel 11 is carried on forks 14 depending from a "crown" 9 mounted at the lower end of the steering column 6, while the spindle 12 of the rear wheel 13 is carried on forks 15 extending rearwardly from and rigidly mounted on the rear end of the backbone 1.

Referring now to FIGURE 9 a bicycle according to the invention of the kind described with reference to FIGURE 2 is illustrated equipped with a number of accessories. The mudguards 100 and 101 provided for the wheels can either be fixed to the frame or arranged to move with the wheels during the working of the suspension. A fixed front cowl 102 may be provided which may have a generally concave space 104 at its rear whose mouth is covered by netting 103, said space being suitable for the carriage of small luggage articles. Weather protection for the rider may be improved by the provision of a cape (not shown) whose front end will suitably be fixed to the top of the cowl and which is adapted to be folded away within the space 104. A generator for a lighting system may be provided at 105 or 106 or a hub-dynamo may be employed. The lighting system may comprise a front lamp suitably fixed in any of the positions indicated at 107 and a rear lamp suitably fixed at either of the positions indicated at 108.

The rear carrying platform 33 is preferably of tubular construction and a large container 113 may be carried thereon. 116 represents a prop which may be folded up alongside the trailing arm 62 while a tyre pump 117 will suitably be located in known manner on the underside of the backbone 1. As will be seen from this figure comparatively large areas suitable for carrying luggage for example at 104 and 113, are provided within the overall configuration of a bicycle according to the invention, while due also to the comparative smallness of the wheels and the relatively large space between the rear of the front wheel and the rider's feet when pedalling, adequate weather protection for the rider can be provided for example by the cowl 102 which extends from the handlebars 7 almost to ground level. Such a cowl has been shown under test to reduce the wind resistance of the rider and the bicycle. These and other advantages of a bicycle according to the invention as compared with a conventional "safety" bicycle will be apparent.

What I claim is:

1. A two wheeled pedal cycle comprising front and rear rubber tyred wheels, each wheel being of an overall diameter of between 12 and 19 inches, a composite frame formed from tubes adhered together and comprising a substantially straight main frame member extending rearwardly from a point above the front wheel towards the rear wheel, said main frame member having upstanding substantially at right angles from its front end a post member housing a steering column which is surmounted by handlebars, a housing for a pedal crank axle secured directly to the underside of the main frame member intermediate its ends, a seat tube surmounted by a saddle in alignment with said housing, said post member and said seat tube being of a length equal to at least half the distance between them and being joined at their lower ends to said main frame member to form a frame of open F-shape, the F-shaped frame being resiliently supported on the front and rear wheels by means including, for mounting the spindle of each wheel, a fork connected to each wheel and to the frame for relative springing movement, and a rubber spring bearing on the fork associated with each wheel and adapted resiliently to resist upward movement of the associated wheel relative to the frame.

2. A two wheeled pedal cycle vehicle according to claim 1, wherein the seat tube and the housing for the pedal crank axle are so joined to the main frame member that the latter is imperforate at the junctions.

3. A two wheeled pedal cycle comprising front and rear rubber tyred wheels, each wheel being of an overall diameter of between 12 and 19 inches, a composite frame formed from tubes adhered together and comprising a substantially straight main frame member extending rearwardly from a point above the front wheel towards the rear wheel, said main frame member having upstanding substantially at right angles from its front end a post member housing a steering column which is surmounted by handlebars, a housing for a pedal crank axle secured directly to the underside of the main frame member intermediate its ends, a seat tube surmounted by a saddle in alignment with said housing, said post member and said seat tube being of a length equal to at least half the distance between them and being joined at their lower ends to said main frame member to form a frame of open F-shape, said main frame member terminating at a point ahead of the rear wheel, a spindle for the rear wheel being carried on its associated fork which trails from a transverse pivot on the main frame member near its rear end and in rear of the pedal crank axle housing, rubber spring means arranged to bear on both the main frame member and the fork structure and adapted to resiliently control pivotal movement of the structure relative to the member.

4. A two wheeled pedal cycle vehicle according to claim 3, wherein the housing for the pedal crank axle, the transverse pivot and the rear wheel spindle are substantially in the same straight line when viewed in side elevation.

5. A two wheeled pedal cycle comprising front and rear rubber tyred wheels, each wheel being of an overall diameter of between 12 and 19 inches, a composite frame formed from tubes adhered together and comprising a substantially straight main frame member extending rearwardly from a point above the front wheel towards the rear wheel, said main frame member having upstanding substantially at right angles from its front end a post member housing a steering column which is surmounted by handlebars, a housing for a pedal crank axle secured directly to the underside of the main frame member intermediate its ends, a seat tube surmounted by a saddle in alignment with said housing, said post member and said seat tube being of a length equal to at least half the distance between them and being joined at their lower ends to said main frame member to form a frame of open F-shape, a tubular member extending forwardly from the seat tube to join the main frame member, said tubular member serving as a frame brace and as a carrying handle located at the point of balance of the machine when it is lifted.

6. A two wheeled pedal cycle as defined in claim 5 including a substantially horizontal platform extending over said rear wheel, said platform including support means projecting from its forward end and extending into said tubular member whereby said tubular member supports said platform on said frame.

7. A two wheeled pedal cycle vehicle comprising front and rear tyred wheels, a frame, said wheels having an outside diameter between 12 and 19 inches and being resiliently mounted on said frame, said frame including a substantially straight main frame member extending from a point vertically above said front wheel toward said rear wheel and terminating at a point spaced from the forward end of said rear wheel, said main frame member having upstanding substantially at right angles from its front end above the front wheel, a post member housing a steering column which is surmounted by handlebars, a seat tube surmounted by a saddle, said post member and seat tube each being of a length equal to at least half the distance between them and connected at their lower ends to said frame member to form a frame of open F-shape, a housing for a pedal crank axle secured to the bottom of said main frame member below said seat post member, a horizontal pivot bearing being disposed on the rear portion of said main frame member at a point spaced forwardly of a leading edge of said rear wheel and spaced rearwardly from said pedal crank axle housing, a trailing arm structure pivotally mounted on said bearing, said arm structure extending rearwardly from said main frame member on both sides of said rear wheel to mount a spindle of the rear wheel, and a single rubber spring member carried on said main frame member in rear of said pedal crank axle housing and operatively connected between said main frame member and arm structure and adapted to resiliently control relative pivotal movement between said frame member and arm structure.

References Cited in the file of this patent

UNITED STATES PATENTS

| | | |
|---|---|---|
| 1,563,094 | Ledig | Nov. 24, 1925 |

FOREIGN PATENTS

| | | |
|---|---|---|
| 1,061,547 | France | Nov. 25, 1953 |
| 1,062,854 | France | Dec. 9, 1953 |
| 1,067,001 | France | Jan. 27, 1954 |
| 488,581 | Italy | Dec. 28, 1953 |
| 507,516 | Belgium | Dec. 15, 1951 |
| 944,173 | Germany | June 7, 1956 |